United States Patent
Couch et al.

(10) Patent No.: US 8,594,900 B2
(45) Date of Patent: Nov. 26, 2013

(54) WHEEL END CONDITION DETECTION

(75) Inventors: Bryan Couch, Balmoral (CA); Daniel Edward Olson, Winnipeg (CA)

(73) Assignee: Motor Coach Industries Limited (CA)

( * ) Notice: Subject to any disclaimer, the term of this patent is extended or adjusted under 35 U.S.C. 154(b) by 0 days.

(21) Appl. No.: 13/561,749

(22) Filed: Jul. 30, 2012

(65) Prior Publication Data

US 2013/0035834 A1 Feb. 7, 2013

Related U.S. Application Data

(60) Provisional application No. 61/515,148, filed on Aug. 4, 2011.

(51) Int. Cl.
*B60T 8/171* (2006.01)
*G01M 17/00* (2006.01)
*B60C 23/20* (2006.01)

(52) U.S. Cl.
USPC ........... 701/70; 701/29.1; 701/29.2; 702/183; 702/185

(58) Field of Classification Search
USPC .................. 701/70, 29.1, 29.2; 702/183, 185
See application file for complete search history.

(56) References Cited

U.S. PATENT DOCUMENTS

| | | | |
|---|---|---|---|
| 5,139,115 A | 8/1992 | Browne et al. | |
| 6,491,357 B2 | 12/2002 | Holst | |
| 6,748,797 B2 | 6/2004 | Breed et al. | |
| 6,829,925 B2 | 12/2004 | Nespo et al. | |
| 6,856,245 B2 | 2/2005 | Smith et al. | |
| 6,960,994 B2 | 11/2005 | Tabata et al. | |
| 7,079,018 B2 | 7/2006 | Hottebart et al. | |
| 7,202,777 B2 | 4/2007 | Tsuji et al. | |
| 7,228,932 B2 | 6/2007 | Rosenthal et al. | |
| 7,289,930 B2 | 10/2007 | Stolzl et al. | |
| 7,363,806 B2 | 4/2008 | Huang et al. | |
| 7,391,308 B2 | 6/2008 | Iwazumi | |
| 7,421,321 B2 | 9/2008 | Breed et al. | |
| 7,487,671 B1 | 2/2009 | Zhu et al. | |

(Continued)

FOREIGN PATENT DOCUMENTS

WO 2004007235 A2 1/2004

OTHER PUBLICATIONS

Han, Jiapeng, Research on ABS and TPMS System Merging Technology, 2009 International Conference on Intelligent Human-Machine Systems and Cybernetics, Aug. 26-27, 2009, pp. 141-144, 978-0-7695-3752-8.*

(Continued)

*Primary Examiner* — Mary Cheung
*Assistant Examiner* — Brian P Sweeney
(74) *Attorney, Agent, or Firm* — Banner & Witcoff, Ltd.

(57) ABSTRACT

An enhanced wheel data processing unit may analyze tire air temperature data from a tire pressure monitoring system (TPMS) and antilock brake system (ABS) wheel speed sensor fault codes from an ABS controller within a vehicle. When the enhanced wheel data processing unit determines that the tire air temperature is above a predetermined threshold for a given tire and that an ABS wheel speed sensor fault code exists for the wheel end corresponding to the same tire, the enhanced wheel data processing unit may initiate a vehicle shutdown or derate procedure. The vehicle shutdown or derate procedure may include instructions to give an operator of the vehicle a warning indicator for a predetermined time period before shutting down or derating the engine power to the vehicle.

18 Claims, 6 Drawing Sheets

(56) References Cited

U.S. PATENT DOCUMENTS

| | | |
|---|---|---|
| 7,594,433 B2 | 9/2009 | Bondu |
| 7,696,902 B2 | 4/2010 | Ichikawa et al. |
| 7,873,449 B2 | 1/2011 | Bujak et al. |
| 2004/0254711 A1 | 12/2004 | Zumberge et al. |
| 2007/0100531 A1* | 5/2007 | Kim .............................. 701/71 |
| 2008/0018445 A1 | 1/2008 | Shimura |
| 2008/0266073 A1 | 10/2008 | Tu et al. |
| 2010/0024939 A1 | 2/2010 | Kusunoki et al. |
| 2010/0292898 A1 | 11/2010 | Stoehr |

OTHER PUBLICATIONS

Yueming, Liu, Design and Implementation of TPMS Based on Wireless Sensor Network, 2010 International Conference on Intelligent System Design and Engineering Application, Oct. 13-14, 2010, pp. 518-523, 978-1-4244-8333-4.*

International Search Report and Written Opinion in corresponding PCT Application No. PCT/IB2012/001985, mailed Feb. 4, 2013, pp. 1-8.

* cited by examiner ary patent
WHEEL END CONDITION DETECTION

This application claims priority to U.S. provisional patent application Ser. No. 61/515,148, filed Aug. 4, 2011, entitled "Wheel End Failure Detection," which is incorporated herein by reference as to its entirety.

TECHNICAL FIELD

Aspects of the invention generally relate to ways in which a wheel end condition in a vehicle may be detected and handled. In particular, tire air temperature information and antilock brake system (ABS) wheel speed sensor fault codes may be used to determine if a wheel end fault or abnormal condition may be developing.

BACKGROUND

Properly functioning tires are important to the safety of a moving vehicle. Because they are the only points at which a vehicle contacts the surface on which the vehicle is moving, one or more malfunctioning tires may have consequences on the performance and safety of the vehicle.

For instance, when a tire becomes punctured, a vehicle may not generally continue to move occupants in the same manner. Therefore, the vehicle typically is stopped and a new tire is fixed in place of the punctured one.

Tire monitoring systems are employed as early warning systems to detect problems with tires. For instance, one standard tire monitoring system monitors the pressure within the tire so that when the pressure is lower or higher than normal, the pressure may be adjusted prior to the tire failing (e.g., bursting, etc.).

However, conventional tire monitoring systems are prone to errors; for instance, a tire may be flagged as requiring attention when in fact it is the sensor that may be malfunctioning. In addition, conventional tire monitoring systems use simplified techniques to tailor a response of the vehicle to a particular condition. For example, conventional tire pressure monitoring systems, while useful, merely measure the pressure and may signal an alarm if the pressure is not within a predefined band.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, non-transitory computer readable media, and apparatuses for detecting a developing wheel end condition, such as a fault or abnormal condition, and initiating a warning response involving vehicle shutdown based on the detected condition.

Other aspects of the disclosure relate to an enhanced wheel data processing unit that may analyze data from a tire air temperature sensor and the fault codes generated by the antilock brake system (ABS) wheel speed sensor in order to determine whether a wheel end fault condition has developed. Once a wheel end fault condition has been detected, enhanced wheel data processing unit may initiate an appropriate response of the vehicle to the wheel end fault condition.

Aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, conventional tire monitoring systems do not provide robust detection of wheel end fault conditions to implement an appropriate vehicle response to the detected condition.

Figure 1:
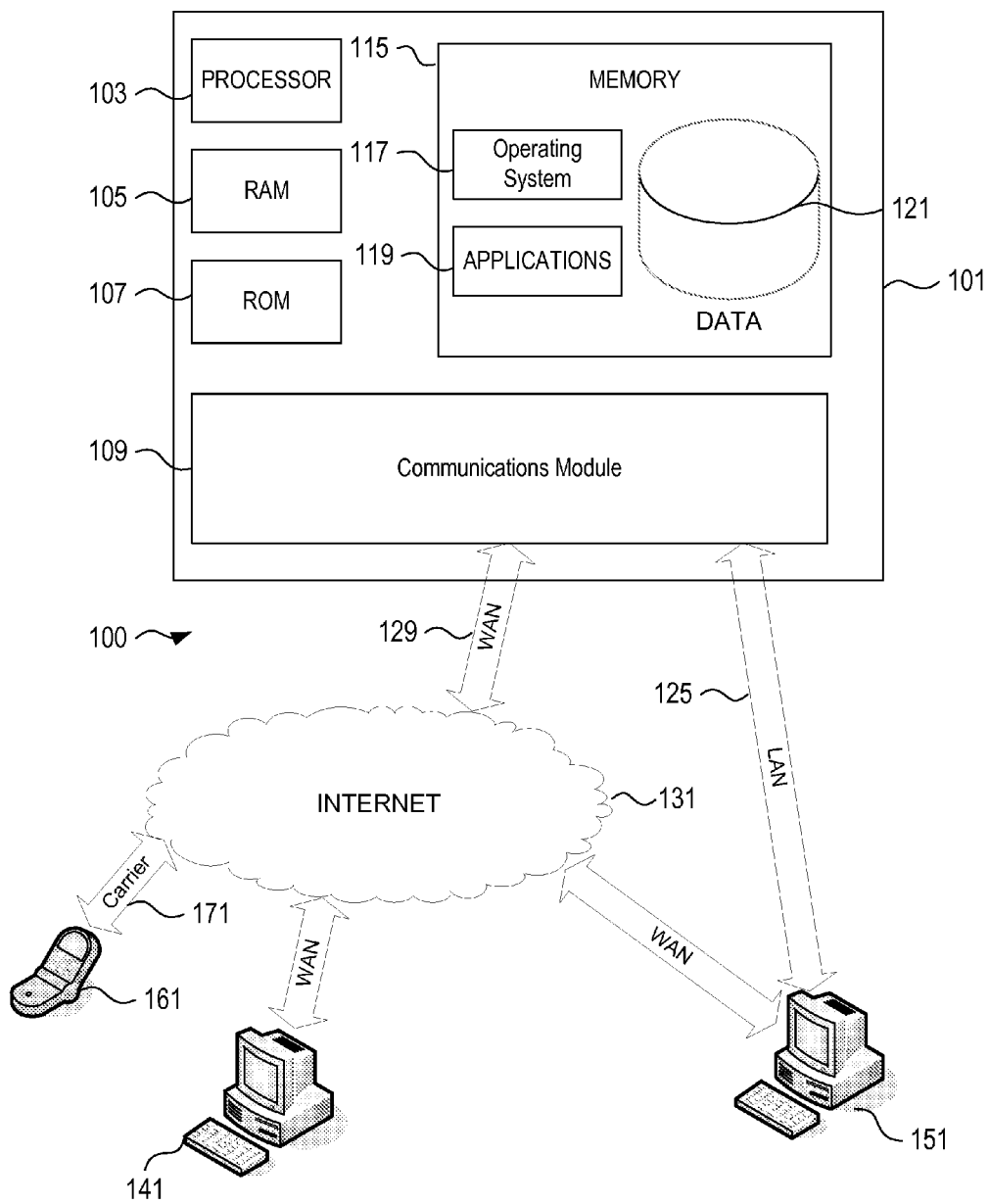
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, vehicle diagnostic systems, network PCs, minicomputers, mainframe computers, distributed computing environments that include any of the above systems or devices, and the like.

With reference to FIG. 1, the computing system environment 100 may include an enhanced wheel data processing unit 101 wherein the processes discussed herein may be implemented. The enhanced wheel data processing unit 101 may have a processor 103 for controlling overall operation of the enhanced wheel data processing unit 101 and its associated components, including random-access memory (RAM) 105, read-only memory (ROM) 107, communications module 109, and memory 115. Processor 103 and its associated components may allow the enhanced wheel data processing unit 101 to run a series of computer-readable instructions related to analyzing tire air temperature data and/or antilock brake system (ABS) wheel speed sensor data to determine if an appropriate vehicle response may need to be implemented. Processor 103 may also direct enhanced wheel data processing unit 101 to implement a predetermined vehicle engine shutdown procedure when the wheel end fault condition is confirmed and/or it has been determined that a wheel end fault condition has developed.

Enhanced wheel data processing unit 101 typically includes a variety of computer readable media. Computer readable media may be any available media that may be accessed by enhanced wheel data processing unit 101 and include both volatile and nonvolatile media, removable and non-removable media. By way of example, and not limitation, computer-readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by enhanced wheel data processing unit 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more applications representing the application data stored in RAM 105 while the enhanced wheel data processing unit 101 is on and corresponding software applications (e.g., software tasks) are running on the enhanced wheel data processing unit 101.

Communications module 109 may include a microphone, keypad, touch screen, and/or stylus through which a user of enhanced wheel data processing unit 101 may provide input, and may also include one or more of a speaker for providing audio output and a video display device for providing textual, audiovisual and/or graphical output.

Software may be stored within memory 115 and/or storage to provide instructions to processor 103 for enhanced wheel data processing unit 101 to perform various functions. For example, memory 115 may store software used by the enhanced wheel data processing unit 101, such as an operating system 117, application programs 119, and an associated database 121. Also, some or all of the computer executable instructions for enhanced wheel data processing unit 101 may be embodied in hardware or firmware.

Enhanced wheel data processing unit 101 may operate in a networked environment supporting connections to one or more remote computing devices, such as computing devices 141, 151, and 161. The computing devices 141, 151, and 161 may be data processing units or control modules that include many or all of the elements described above relative to the enhanced wheel data processing unit 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, enhanced wheel data processing unit 101 may be connected to the LAN 125 through a network interface or adapter in the communications module 109. When used in a WAN networking environment, the enhanced wheel data processing unit 101 may include a modem in the communications module 109 or other means for establishing communications over the WAN 129, such as the Internet 131 or other type of computer network. For instance, logged information from any of the sensors within a vehicle may be received through a network, data port, or On Board Diagnostic (OBD) connection to the vehicle with a wired or wireless connection and associated hardware to a device such as an external computer, processor, device, display, etc. It will be appreciated that the network connections shown are illustrative and other means of establishing a communications link between the computing devices and/or data processing units may be used. Various well-known protocols such as TCP/IP, Ethernet, FTP, HTTP, SAE J1939, and the like may be used, and the system can be operated in a client-server configuration to permit a user to retrieve web pages from a web-based server. Any of various conventional web browsers can be used to display and manipulate data on web pages.

Additionally, one or more application programs 119 used by the enhanced wheel data processing unit 101, according to an illustrative embodiment, may include computer executable instructions for invoking user functionality related to communication including, for example, email, short message service (SMS), and voice input and speech recognition applications. In addition, the application programs 119 may include computer executable instructions for invoking functionality related to implementing a vehicle shutdown procedure.

Embodiments of the disclosure may include forms of computer-readable media. Computer-readable media include any available media that can be accessed by an enhanced wheel data processing unit 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor 103 on enhanced wheel data processing unit 101. Such a processor may execute computer-executable instructions stored on a computer-readable medium.

Figure 2:
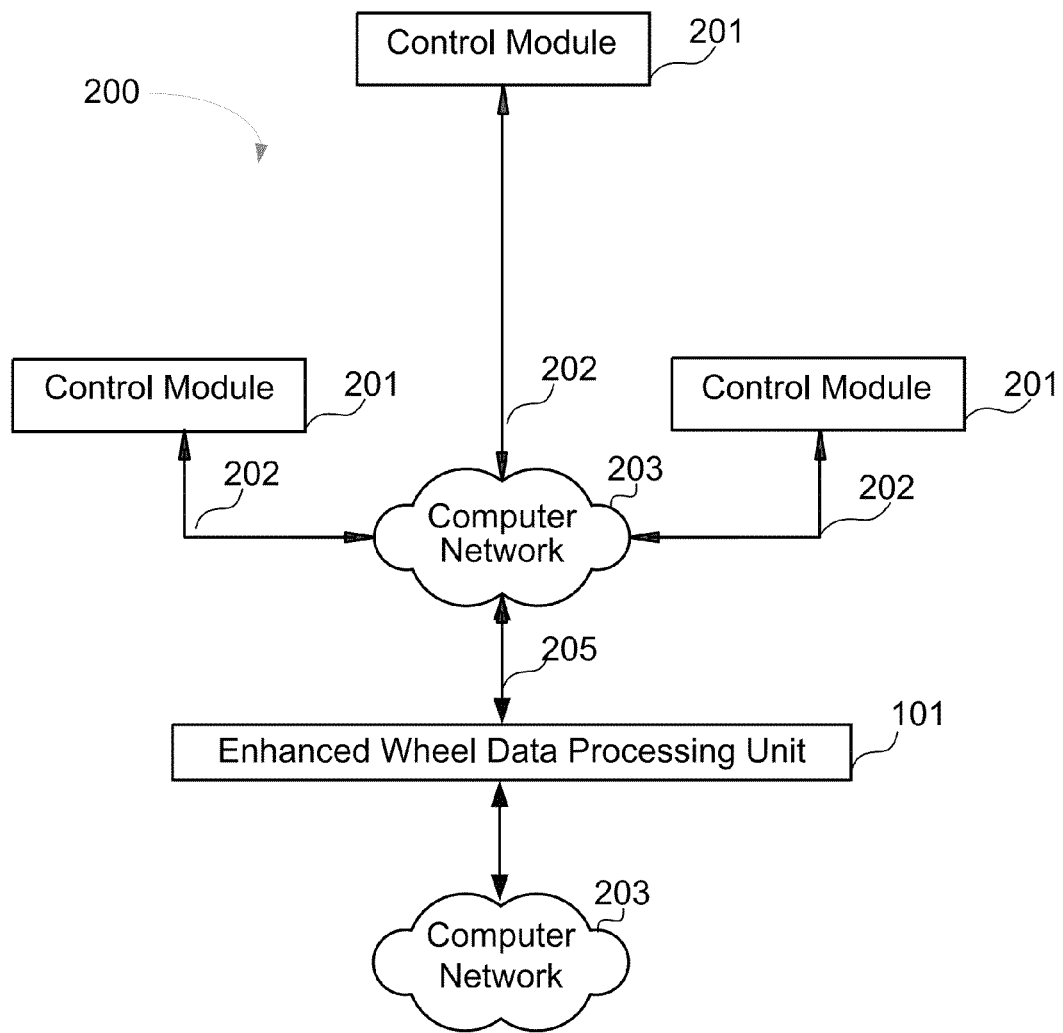
FIG. 2 is an illustrative block diagram of control modules and a data processing unit that may be used to implement the processes and functions of one or more aspects of the present disclosure.

Referring to FIG. 2, an illustrative system 200 for implementing example embodiments according to the present disclosure is shown. As illustrated, system 200 may include one or more control modules 201. Control modules 201 may be local or remote, and may be connected by one of communications links 202 to computer network 203 that is linked via communications links 205 to enhanced wheel data processing unit 101. Control modules 201 may include many of the same hardware/software components as enhanced wheel data processing unit 101. In some embodiments, control modules 201 may represent controllers for various sensors and/or systems within a vehicle that transmit data to enhanced wheel data processing unit 101. In system 200, enhanced wheel data processing unit 101 may be any suitable server, processor, computer, or data processing device, or combination of the same. Enhanced wheel data processing unit 101 may be used to process the instructions received from one or more sensors.

Computer network 203 may be any suitable computer network including the Internet, an intranet, a controller area network (CAN), a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between control modules 201 and enhanced wheel data processing unit 101, such as network links, dial-up links, wireless links, hard-wired links, etc.

The steps that follow in the Figures may be implemented by one or more of the components in FIGS. 1 and 2 and/or other components, including other computing devices.

In accordance with various aspects of the disclosure, methods, computer-readable media, and apparatuses are disclosed for detecting a wheel end condition in a vehicle. In some aspects, the wheel end condition, such as a fault or abnormal condition, may be reached when the temperature of the wheel falls outside of predetermined norms.

As mentioned before the wheel end fault condition may be determined by an enhanced wheel data processing unit 101 configured to run computer-executable program instructions related to each step of the fault detection and response processes. In certain aspects, the enhanced wheel data processing unit 101 may receive temperature data from a tire air temperature sensor that may be a part of a tire pressure monitoring system (TPMS) and fault code information from an ABS wheel speed sensor that may be a part of an ABS sensor module within a vehicle. Both of these pieces of information may be processed by the enhanced wheel data processing unit 101 to determine if a wheel end fault condition (e.g., a possible bearing and/or hub fault, etc.) may exist.

In this way, the tire air temperature data may be validated by using the ABS fault code information so that an appropriate vehicle response may be implemented. For instance, if the tire air temperature sensor is damaged during maintenance, then the temperature data from the sensor may be corrupted. In this case, the current fault status read from the ABS wheel speed sensor may be used to confirm that the wheel is actually performing normally and that only the temperature sensor is damaged.

In certain aspects, the tire air temperature sensor may provide data related to the tire air temperature to the enhanced wheel data processing unit 101. In some embodiments, this data may be provided within a tire condition message PGN 65267 provided by the tire pressure monitoring system (TPMS) receiver via a J1939 CAN network. This message may include both the tire location and the tire air temperature and may be transmitted at predetermined intervals (e.g., 10 s). In other aspects, the ABS wheel speed sensor may be a counter that may be located on a wheel axle which counts the revolutions of a tire. The ABS wheel speed sensor may generate various fault codes related to a vehicle's speed when abnormal conditions arise and may transmit these fault codes to the enhanced wheel data processing unit 101. An ABS fault diagnostic message (DM1) including the fault codes may be transmitted on the J1939 CAN network when the ABS sensor fault is detected. The fault diagnostic message may include the location of the sensor fault and any fault mode information that may be available.

To generate one of the fault codes, the ABS speed sensor may measure an air gap. More particularly, the ABS speed sensor may measure the air gap between the speed sensor located on a wheel axle and a tone ring on a wheel hub. If a proper air gap is not maintained (e.g., due to wobble of the sensor with respect to the tone ring as the wheel spins, etc.), then a fault code may be generated. In other words, a fault code related to the air gap may be generated when the wheel bearings may be degraded to the point where the air gap becomes uneven or goes beyond the range of what is allowed.

Other fault codes generated by the ABS wheel speed sensor may be related to various electrical short and/or open circuit conditions (e.g., short to ground, open circuit, short circuit, etc.). For instance, one or more of these electrical conditions may be more likely to result when a wheel is in motion as the temperature surrounding the ABS wheel speed sensor rises above component and wire insulation specifications.

Further still, the ABS wheel speed sensor may generate fault codes due to an incorrect pole wheel, slip, speed dropout, abnormal speed, and/or abnormal frequency condition. An incorrect pole wheel may be generated when an incorrect tone ring has been affixed to the wheel and/or when the tone ring has been damaged. A slip condition may result from a wheel being locked out, and a speed drop out condition may result from the ABS wheel speed sensor losing its ability to measure the speed of the wheel. An abnormal speed condition may result when the ABS wheel speed sensor on one of the wheels of the vehicle outputs speed data that is different from the speed data outputted by other ABS wheel speed sensors on other wheels of the vehicle beyond a predetermined tolerance. Finally, an abnormal frequency condition may result when the ABS wheel speed sensor detects that the frequency of rotation of the sensor output may be too high.

Several control modules (e.g., control modules 201 and/or enhanced wheel data processing unit 101) may communicate through a network (e.g., network 203) to allow data processing unit 101 to decide whether or not a vehicle response (e.g., a vehicle shutdown procedure, etc.) should be implemented. In some embodiments, the control modules 201 may include an ABS controller and a tire pressure monitoring system (TPMS) controller. The ABS controller may control the operation of the ABS wheel speed sensor; meanwhile, the TPMS controller may control the operation of the tire air temperature sensor.

In some embodiments, the enhanced wheel data processing unit 101 may include a multiplexing body controller. The multiplexing body controller may include memory that includes a log of the time/date of the last wheel end fault condition and/or a log of the amount of the time the vehicle was driven over a predetermined speed (e.g., 5 km/hr) after a wheel end fault condition has occurred. The multiplexing body controller may receive diagnostic mode fault code information and temperature data from the ABS controller and the TPMS controller, respectively, through a datalink (e.g., SAE J1939 datalink, etc.).

In some aspects, the multiplexing body controller may receive diagnostic mode fault code information from the ABS controller through a gateway. In this embodiment, the ABS controller may be a part of a first communication network and the multiplexing body controller may be a part of a second communication network. The gateway may facilitate communication of data from the first network to the second network.

The multiplexing body controller (e.g., in enhanced wheel data processing unit 101) may process the data received from the TPMS controller and the ABS controller to determine what, if any, action should be taken based on the received data. For instance, if the temperature data for a given tire from the TPMS controller is above a predetermined threshold (e.g., 92° C., etc.) and a fault condition on the corresponding wheel end is transmitted by the ABS controller for more than a predetermined time period (e.g., 3 s, etc.), then the multiplexing body controller may transmit instructions to an engine controller (e.g., control module 201). In some aspects, the engine controller may control all aspects of engine performance (e.g., fuel injection, ignition, etc.). The instructions transmitted to the engine controller from the multiplexing body controller may instruct the engine controller to initiate an engine shutdown or derate procedure (e.g., to reduce engine speed). In certain aspects, a derate procedure may include slowing the vehicle to a predetermined speed (e.g., 5 mph). The multiplexing body controller may be configured to receive the tire air temperature data from the TPMS controller and the plurality of antilock brake system (ABS) wheel speed sensor fault codes from the ABS controller. The multiplexing body controller may be configured to analyze the tire air temperature data and the plurality of antilock brake system (ABS) wheel speed sensor fault codes to determine whether a wheel end fault condition has developed and to generate an alert corresponding to the wheel end fault condition. The alert may be an indication that a vehicle component condition may be imminent that may affect operation of the vehicle.

In some aspects, the engine shutdown procedure may include commands transmitted from the multiplexing body controller to the engine controller to cause an alert to be generated. An alert may comprise any suitable visual, audio or other sensory signal. For example, an alert may comprise a flashing engine warning lamp on the dashboard of the vehicle. This warning lamp may flash (and in some embodiments, a buzzer may sound) for a predetermined time period (e.g., 30 s, etc.) to warn an operator of the vehicle that an engine shutdown procedure and/or engine derate procedure is about to begin and may give the operator of the vehicle enough time to take appropriate action (e.g., pulling over to the side of the road, into a parking lot, etc.). In some aspects, multiple warning lamps (e.g., one for a tire air temperature over normal, another for an ABS wheel speed sensor fault, and a third one for the stop engine warning) may be displayed to the operator of the vehicle. After the predetermined time period for warning the operator is over, the engine controller may switch off an ignition engine run output signal to the engine, thereby shutting down the engine (e.g., by shutting down power to the fuel injectors, etc.). In some embodiments, an engine override switch included in the vehicle may allow an operator of the vehicle to delay the shutting down or derating of the engine by activating (e.g., depressing, flipping, etc.) the switch. More specifically, by activating the engine override switch, the operator may reset the predetermined time period for warning the operator that an engine shutdown procedure is about to begin.

Figure 3:
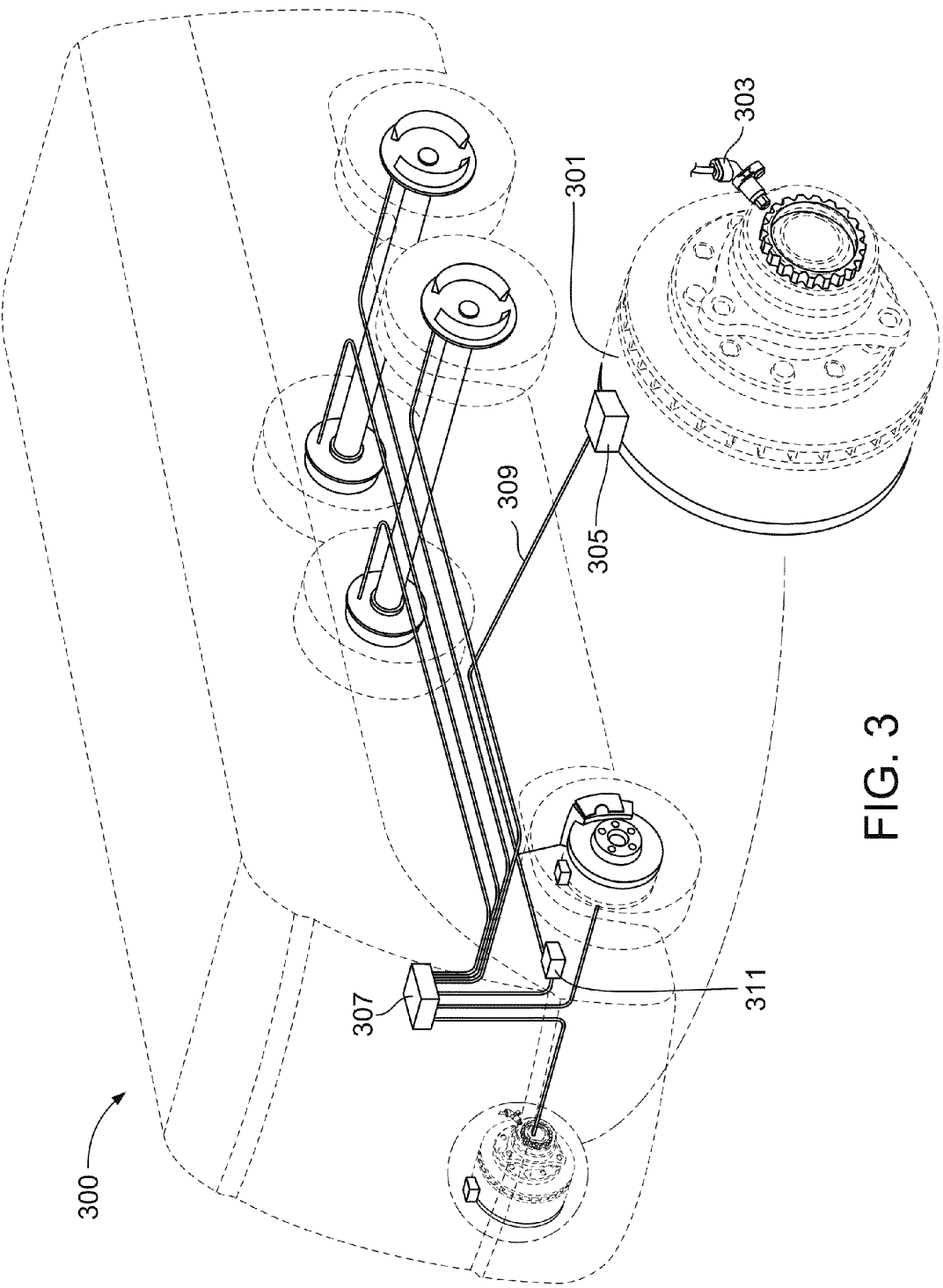
FIG. 3 is an illustration of a vehicle with various sensors in accordance with one or more aspects of the disclosure.

FIG. 3 shows an illustration of a vehicle with various sensors in accordance with at least one aspect of the disclosure. As shown in FIG. 3, vehicle 300 includes at least one wheel 301 with a wheel end structure. In some embodiments, the wheel 301 with a wheel end structure may include a hub and hub assembly that holds the wheel 301 in place. The wheel 301 may include an ABS wheel speed sensor 303 and a tire air temperature sensor 305. In addition, a TPMS controller/receiver 311 may communicate with the tire air temperature sensor 305 and a multiplexing body controller 307 for control and data exchange purposes. Information from both the ABS wheel speed sensor 303 and the tire air temperature sensor 305 may ultimately be communicated to the multiplexing body controller 307 via communication bus 309 (e.g., via a J1939 network). One of ordinary skill in the art would recognize that although FIG. 3 shows only two sensors in communication with the multiplexing body controller 307, any number of sensors and associated data may be communicated to multiplexing body controller 307. In addition, although FIG. 3 shows only one multiplexing body controller 307, a vehicle may in fact have multiple multiplexing body controllers 307.

Figure 4A:
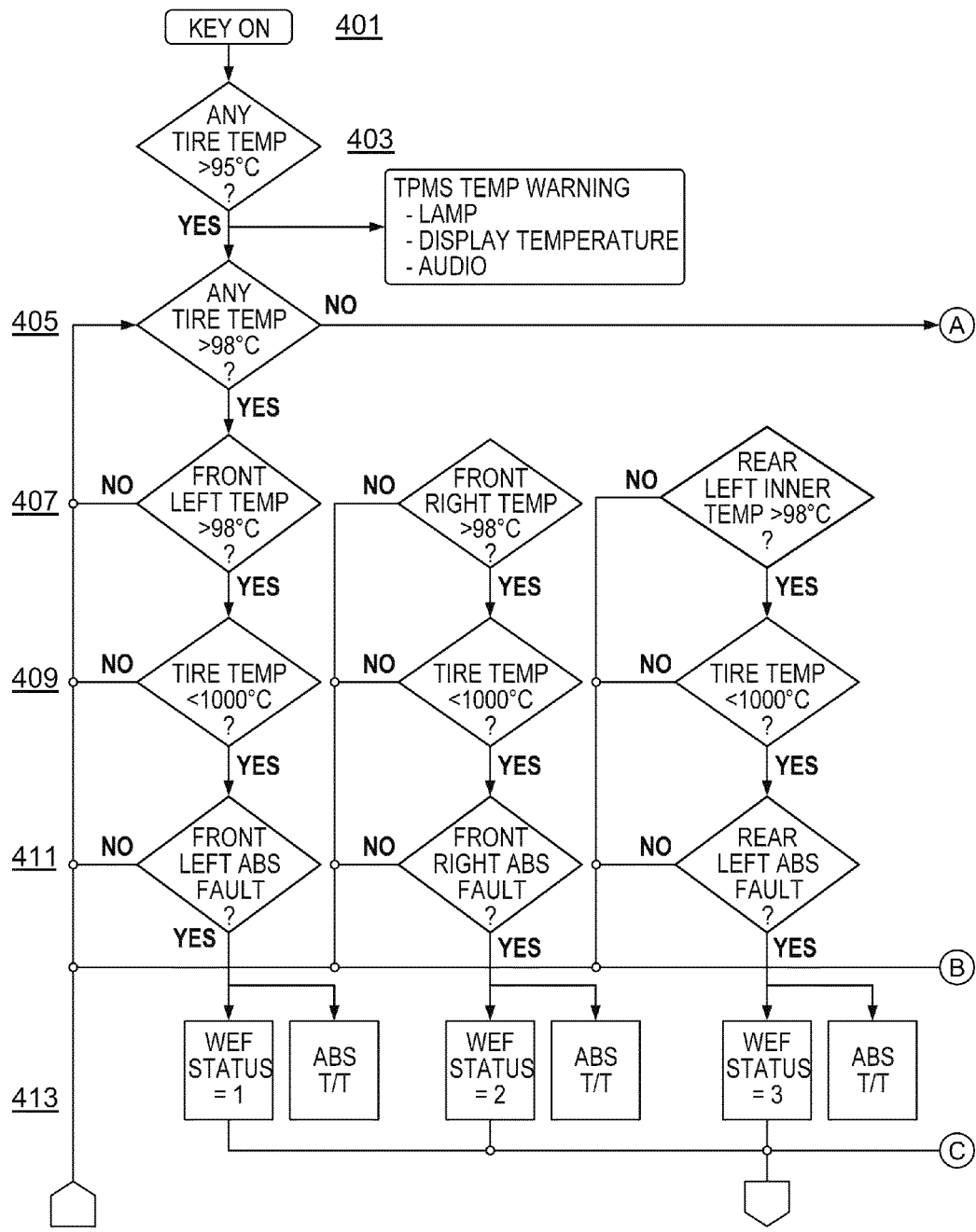
FIG. 4a shows the first part of a flow diagram of the wheel end fault condition process implemented by enhanced wheel data processing unit, in accordance with one or more aspects of the disclosure.
Figure 4A:
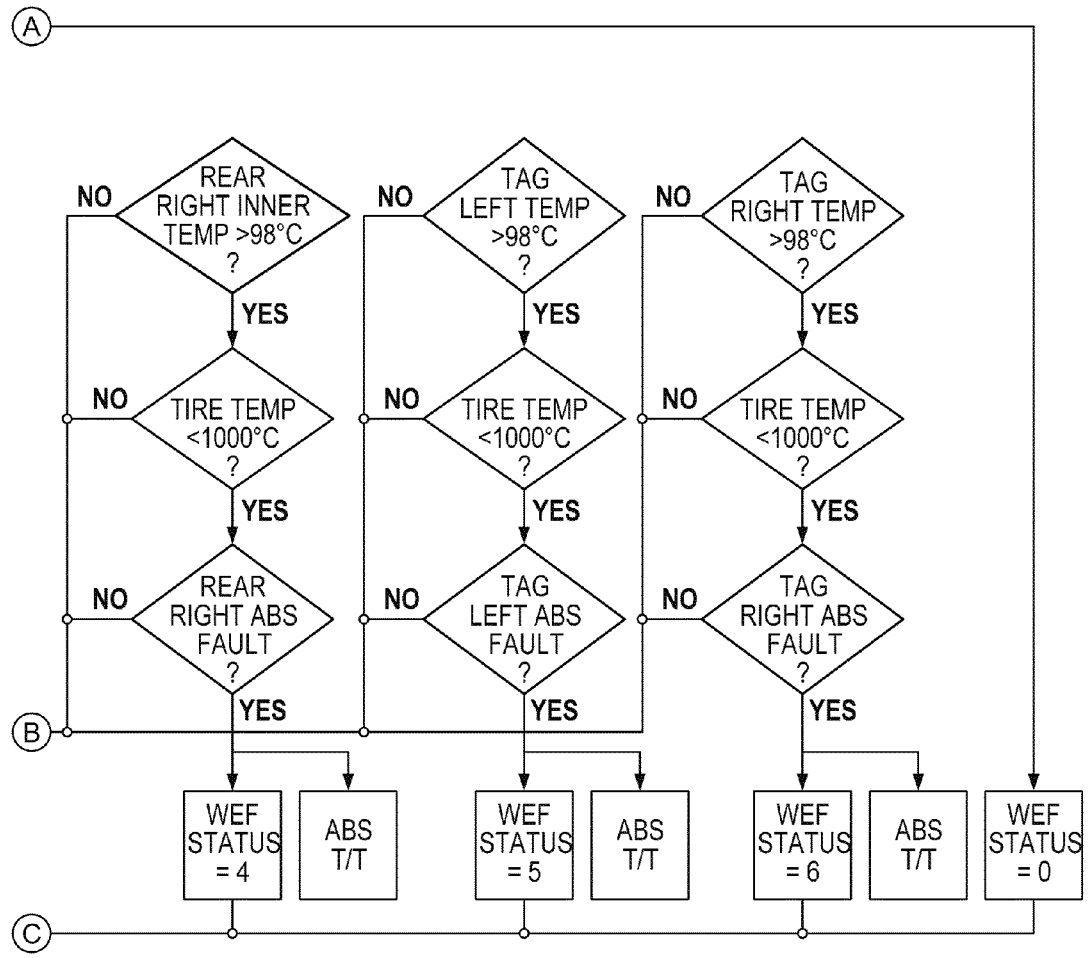
Figure 4B:
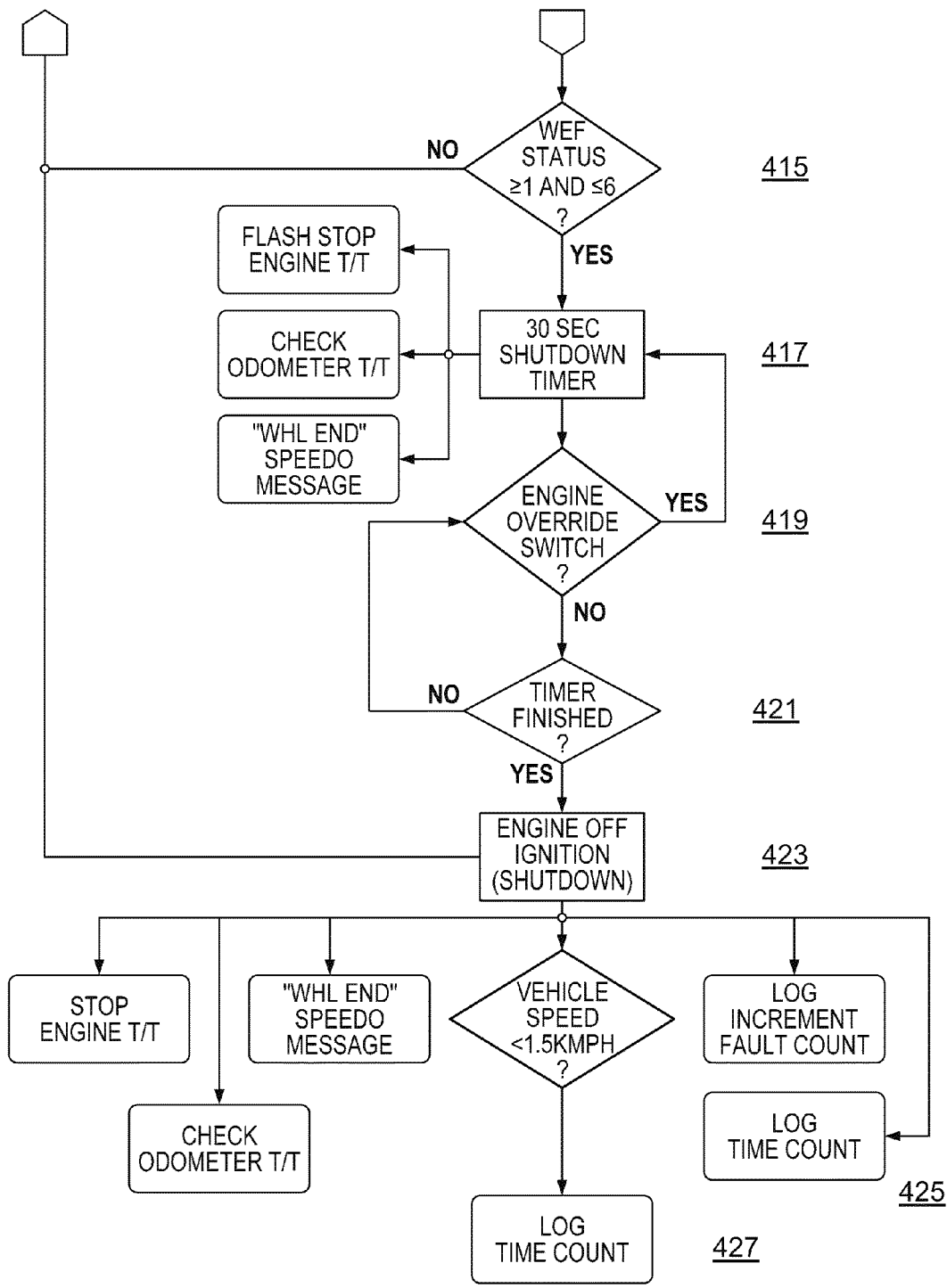
FIG. 4b shows the second part of a flow diagram of the wheel end fault condition process implemented by enhanced wheel data processing unit, in accordance with one or more aspects of the disclosure.

FIG. 4a shows the first part of a flow diagram of the wheel end fault condition shutdown process implemented by enhanced wheel data processing unit 101, in accordance with at least one aspect of the disclosure. Meanwhile, FIG. 4b shows the second part of a flow diagram of the wheel end fault condition shutdown process implemented by enhanced wheel data processing unit 101, in accordance with at least one aspect of the disclosure. The process may start out at step 401 where the engine of a vehicle with enhanced wheel data processing unit 101 is turned on. In normal operation, as discussed previously, the ABS controller 201 and the TPMS controller 201 may transmit ABS wheel speed sensor fault codes and tire air temperature data to the enhanced wheel data processing unit 101 (i.e., multiplexing body controller). In some embodiments, the tire air temperature data may include or be directed at the temperature of materials (e.g., rubber of the tire) associated with the tire, rather than the temperature of the air in and/or around the tire.

The process may then move to step 403 where the enhanced wheel data processing unit 101 may determine if the tire air temperature data from the TPMS controller 201 indicates that the tire air temperature of any of the wheels is greater than a first predetermined threshold (e.g., 95° C.). If the tire air temperature data indicates that the tire air temperature of any of the wheels is greater than the first predetermined threshold, enhanced wheel data processing unit 101 and/or tire pressure monitoring system controller 201 may present various visual and audio warnings to the operator of the vehicle (e.g., a TPMS temperature warning lamp and audio alarm including the out-of-bounds temperature). If the tire air temperature data from any of the wheels indicates that the tire air temperature is not greater than the first predetermined threshold, then enhanced wheel data processing unit 101 may take no further action.

If the tire air temperature data from any of the wheels indicates that the tire air temperature is greater than the first predetermined threshold, the process may then move to step 405 where the enhanced wheel data processing unit 101 may determine if the tire air temperature data from the TPMS controller 201 indicates that the tire air temperature of any of the wheels is greater than a second predetermined threshold (e.g., 98° C.). If the tire air temperature data from the TPMS controller 201 indicates that the tire air temperature of any of the wheels is not greater than the second predetermined threshold, then the process may move directly to step 413, where the wheel end fault (WEF) condition status indicator is set to 0. Then the process may move to step 415 in FIG. 4b where a decision is made as to whether the WEF condition status indictor is greater than or equal to 1 and less than or equal to 6. Because the WEF condition status indictor is not within these bounds (i.e., the value of WEF condition status indicator is 0), the process may move back up to step 405 in FIG. 4a where the process resets.

If the tire air temperature data from the TPMS controller 201 indicates that the tire air temperature of any of the wheels is greater than the second predetermined threshold in step 405, the process may move to step 407 where the enhanced wheel data processing unit 101 may determine the location of the tire that may be outputting a tire air temperature greater than the second predetermined threshold. For instance, if the front left tire temperature is greater than the second predetermined threshold, the process may move to step 409 where the enhanced wheel data processing unit 101 may determine if the front left tire temperature is less than a third predetermined threshold (e.g., 1000° C.). The check in step 409 may be performed to determine if the temperature sensor is malfunctioning. For instance, if the temperature data from the front left tire is greater than 1000° C., then the process may move back to step 405 because the temperature sensor is likely malfunctioning or data is missing and therefore is likely that an over-temperature condition does not exist on the front left tire.

If the temperature of the front left tire is less than the third predetermined threshold, the process may move to step 411 where the enhanced wheel data processing unit 101 may check to determine if there is an ABS fault message related to the front left wheel end. If not, then the process may move back to step 405 where the process resets. If there is an ABS fault message related to the front left wheel end, then the process may move to step 413 where the enhanced wheel data processing unit 101 may set a variable called WEF status to a value of 1. It should be noted that a similar sequence of steps 407-413 including the temperature and/or ABS sensor fault message checks may occur for other tire and/or wheel end locations (e.g., front right, rear left, rear right, tag left, tag right, etc.). The only difference between the check for one tire/wheel end location and another is that the WEF status indicator is set to a value from 1 to 6 depending on the location of the wheel end/tire in step 413 of the process shown in FIG. 4a.

Once the WEF status indicator is set to the appropriate value in step 413, the process may then move to step 415 in FIG. 4b where enhanced wheel data processing unit 101 may check to see if the WEF status indicator is a value from 1 to 6, inclusive. If not, the process may move back to step 405, where the process resets. If the WEF status indicator value is from 1 to 6, inclusive, the process may move to step 417 where the enhanced wheel data processing unit 101 may initiate a warning to the operator of the vehicle that a shutdown is imminent in a predetermined time period (e.g., 30 s). These warnings may include a flashing of the stop engine lamp on a dashboard of the vehicle. Enhanced wheel data processing unit 101 may also check and log the odometer reading and may output a message indicating the speed of the vehicle when a wheel end fault condition has developed.

The process may then move to step 419 where enhanced wheel data processing unit 101 may give the operator of the vehicle an opportunity to select an engine override switch. If the operator activates (e.g., depresses, etc.) the engine override switch, the predetermined time period in step 417 for engine shutdown may reset. The operator of the vehicle may activate the engine override switch any number of times to allow him or her to drive the vehicle to an appropriate location for engine shutdown.

The process may then move to step 421 where the enhanced wheel data processing unit 101 may determine if the predetermined time period for engine shutdown indicated in step 417 has lapsed. If not, the process may move back to step 419, where the operator may be given more time to activate the engine override switch.

If the predetermined time period indicated in step 417 has lapsed, the process may move to step 423 where the engine is turned off (e.g., shutdown). As part of the shutdown procedure, the enhanced wheel data processing unit 101 may output a stop engine lamp, may check the odometer reading, may output a message indicating the speed of the vehicle when the wheel end fault condition has developed, may increment the wheel end fault condition count in a log, and may log the time of the wheel end fault condition.

The enhanced wheel data processing unit 101 may also determine if the vehicle speed is less than a predetermined threshold (e.g., 1.5 kilometers per hour) when the shutdown occurs in step 425. If the vehicle speed is less than the predetermined threshold, the enhanced wheel data processing unit 101 may log the time in step 427.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A non-transitory computer-readable storage medium having computer-executable program instructions stored thereon that, when executed by a processor, cause the processor to perform steps comprising:
   (i) receiving tire air temperature data of a vehicle from a tire-pressure monitoring system;
   (ii) receiving a message with at least one antilock brake system (ABS) wheel speed sensor fault code of the vehicle from an ABS controller;
   (iii) analyzing the tire air temperature data to determine when the tire air temperature data indicates that at least one of a plurality of tires associated with the vehicle exhibits a tire air temperature above a first predetermined threshold;
   (iv) when the tire air temperature data indicates that the at least one of a plurality of tires associated with the vehicle exhibits the tire air temperature above the first predetermined threshold, analyzing the message to determine when the at least one antilock brake system (ABS) wheel speed sensor fault code in the message corresponds to a wheel end associated with the at least one of the plurality of tires; and
   (v) when the at least one antilock brake system (ABS) wheel speed sensor fault code in the message corresponds to the wheel end associated with the at least one of the plurality of tires, initiating at least one of a shutdown or derate procedure for the vehicle.

2. The computer-readable storage medium of claim 1, wherein the tire air temperature data includes tire air temperature values and a tire location that corresponds to each of the tire air temperature values.

3. The computer-readable storage medium of claim 1, wherein the message is transmitted on a J1939 CAN network and includes a wheel end location of each of the plurality of ABS wheel speed sensor fault codes.

4. The computer-readable storage medium of claim 1, wherein the at least one ABS wheel speed sensor fault code is chosen from the group consisting of: an improper air gap, an electrical open circuit within an ABS wheel speed sensor, an electrical short circuit within the ABS wheel speed sensor, an incorrect pole wheel, a slip condition, a speed drop-out condition, an abnormal speed condition, and an abnormal frequency condition.

5. The computer-readable storage medium of claim 1, wherein the receiving the message occurs through a gateway configured to facilitate communication between a first network and a second network.

6. The computer-readable storage medium of claim 1, wherein the at least one of the shutdown or derate procedure comprises transmitting instructions to an engine controller.

7. The computer-readable storage medium of claim 6, wherein the instructions comprise commands to cause an engine warning lamp to flash for a predetermined time period on a dashboard of the vehicle.

8. The computer-readable storage medium of claim 7, wherein an engine associated with the vehicle is at least shut down or derated after expiration of the predetermined time period.

9. The computer-readable storage medium of claim 7, wherein the predetermined time period is configured to be reset when an operator of the vehicle depresses an engine override switch.

10. The computer-readable storage medium of claim 1, wherein the processor further performs: analyzing the tire air temperature data to determine when the tire air temperature data indicates that the at least one of a plurality of tires associated with the vehicle exhibits the tire air temperature below a second predetermined threshold as a check to determine if a tire air temperature sensor is functioning properly.

11. The computer-readable storage medium of claim 1, wherein the processor further performs: logging an odometer reading of the vehicle when the shutdown procedure is initiated.

12. A method comprising:
at a communication module of a data processing unit, receiving tire air temperature data from a tire pressure monitoring system;
at the communication module, receiving a message with a plurality of antilock brake system (ABS) wheel speed sensor fault codes from an ABS controller;
using a processor associated with the data processing unit, analyzing the tire air temperature data to determine when the tire air temperature data indicates that at least one of a plurality of tires associated with a vehicle exhibits a tire air temperature above a first predetermined threshold;
using the processor, when the tire air temperature data indicates that the at least one of a plurality of tires associated with the vehicle exhibits the tire air temperature above the first predetermined threshold, analyzing the message to determine when one of the plurality of antilock brake system (ABS) wheel speed sensor fault codes in the message corresponds to a wheel end associated with the at least one of the plurality of tires; and
using the processor, when the one of the plurality of antilock brake system (ABS) wheel speed sensor fault codes in the message corresponds to the wheel end associated with the at least one of the plurality of tires, initiating at least one of a shutdown or derate procedure for the vehicle.

13. The method of claim 12, wherein the ABS wheel speed sensor fault codes are chosen from the group consisting of: an improper air gap, an electrical open circuit within an ABS wheel speed sensor in communication with the ABS controller, an electrical short circuit within the ABS wheel speed sensor, an incorrect pole wheel, a slip condition, a speed drop-out condition, an abnormal speed condition, and an abnormal frequency condition.

14. The method of claim 12, wherein the at least one of the shutdown or derate procedure causes fuel injectors associated with an engine of the vehicle to at least shut off or derate.

15. The method of claim 12, wherein the at least one of the shutdown or derate procedure is configured to allow an operator of the vehicle to delay onset of vehicle shutdown or derating by activating an engine override switch.

16. A system comprising:
a tire pressure monitoring system (TPMS) controller configured to receive tire air temperature data from a plurality of tire temperature sensors within a vehicle;
an antilock brake system (ABS) controller configured to receive a plurality of antilock brake system (ABS) wheel speed sensor fault codes from a plurality of ABS wheel speed sensors within the vehicle; and
a multiplexing body controller configured to receive the tire air temperature data from the TPMS controller and the plurality of antilock brake system (ABS) wheel speed sensor fault codes from the ABS controller and configured to analyze the tire air temperature data and the plurality of antilock brake system (ABS) wheel speed sensor fault codes to determine whether a wheel end fault condition has developed and to generate an alert corresponding to the wheel end fault condition.

17. The system of claim 16, wherein the generating the alert includes initiating at least a shutdown or a derate procedure that comprises displaying a warning lamp to an operator of the vehicle for a predetermined time period and at least shutting down or derating an engine associated with the vehicle after the predetermined time period has expired.

18. The system of claim 16, wherein the tire air temperature data includes tire air temperature values and a tire location that corresponds to each of the tire air temperature values.

* * * * *